United States Patent
Miller et al.

(10) Patent No.: US 11,951,384 B2
(45) Date of Patent: Apr. 9, 2024

(54) SYSTEM AND METHOD FOR VIRTUAL CHARACTER ANIMATION USING MOTION CAPTURE

(71) Applicant: TAKE-TWO INTERACTIVE SOFTWARE, INC., New York, NY (US)

(72) Inventors: James Stuart Miller, New York, NY (US); Gustavo Eggert Boehs, Oakville (CA); Cory John Alderman, New York, NY (US); Adam De Oliveira, Westbury, NY (US)

(73) Assignee: Take-Two Interactive Software, Inc., New York, NY (US)

( * ) Notice: Subject to any disclaimer, the term of this patent is extended or adjusted under 35 U.S.C. 154(b) by 337 days.

(21) Appl. No.: 17/517,554

(22) Filed: Nov. 2, 2021

(65) Prior Publication Data

US 2022/0134218 A1     May 5, 2022

Related U.S. Application Data

(60) Provisional application No. 63/108,779, filed on Nov. 2, 2020.

(51) Int. Cl.
*A63F 13/212*     (2014.01)
*A63F 13/52*      (2014.01)
(Continued)

(52) U.S. Cl.
CPC ............ *A63F 13/212* (2014.09); *A63F 13/52* (2014.09); *G06F 3/014* (2013.01); *G06N 3/04* (2013.01);
(Continued)

(58) Field of Classification Search
CPC ................... A63F 13/212; A63F 13/52; A63F 2300/1012; A63F 2300/66; G06F 3/014;
(Continued)

(56) References Cited

U.S. PATENT DOCUMENTS 9,911,234 B2 *   3/2018  Miller ................. G06V 20/10
10,198,845 B1 *  2/2019  Bhat ................... G06V 40/176
(Continued)

OTHER PUBLICATIONS

Han et al., Online Optical Marker-based Hand Tracking with Deep Labels, *ACM Transactions on Graphics*, (Aug. 2018), vol. 37, No. 4, Article 1, 10 pages.
(Continued)

*Primary Examiner* — Pierre E Elisca
(74) *Attorney, Agent, or Firm* — Orrick, Herrington & Sutcliffe LLP

(57) ABSTRACT

A system and method for motion capture to efficiently render in-game objects, including characters, and controlling animation of characters and non-player characters. In some embodiments, the motion capture includes a machine learning model that can take as inputs information about the hand pose of a person from multiple sensors over a period of time and generates a highly probable hand pose prediction from that information, based on what it learns from a previously captured dataset of high quality sample motion captures. The systems and methods described herein overcome the imprecision conventional optical marker pipelines for the case of finger movement, where the slightest imprecision yields results that are not good enough for production.

20 Claims, 8 Drawing Sheets

(51) Int. Cl.
*G06F 3/01* (2006.01)
*G06N 3/04* (2023.01)
*G06N 3/08* (2023.01)
*G06T 7/60* (2017.01)
*G06T 7/70* (2017.01)
*G06T 13/40* (2011.01)
*G06T 15/00* (2011.01)
*G06V 10/94* (2022.01)
*G06V 40/10* (2022.01)

(52) U.S. Cl.
CPC ............... *G06N 3/08* (2013.01); *G06T 7/60* (2013.01); *G06T 7/70* (2017.01); *G06T 13/40* (2013.01); *G06T 15/00* (2013.01); *G06V 10/95* (2022.01); *G06V 40/107* (2022.01); *A63F 2300/1012* (2013.01); *A63F 2300/66* (2013.01); *G06T 2207/30196* (2013.01); *G06T 2207/30204* (2013.01)

(58) Field of Classification Search
CPC .. G06F 7/70; G06F 15/00; G06N 3/04; G06N 3/08; G06T 7/60; G06T 13/40; G06T 2207/30204; G06V 10/95; G06V 40/107
USPC .......................................................... 463/36
See application file for complete search history.

(56) References Cited

U.S. PATENT DOCUMENTS

| | | | | |
|---|---|---|---|---|
| 10,559,111 | B2* | 2/2020 | Sachs | G06F 18/23 |
| 11,083,950 | B2* | 8/2021 | Mochizuki | G06T 7/00 |
| 11,562,523 | B1* | 1/2023 | Starke | G06V 40/103 |
| 2018/0303383 | A1* | 10/2018 | Connor | G06F 3/014 |
| 2019/0094981 | A1* | 3/2019 | Bradski | H04N 21/414 |
| 2019/0114546 | A1* | 4/2019 | Anil | G06N 3/084 |
| 2019/0287288 | A1* | 9/2019 | Guay | G06T 13/40 |
| 2021/0327135 | A1* | 10/2021 | Borovikov | G06F 18/214 |

OTHER PUBLICATIONS

Mueller et al., 2019 https://handtracker.mpl-inf.mpg.de/projects/TwoHands/.

Schroeder et al., Reduced Marker Layouts for Optical Motion Capture, Conference: ACM SIGGRAPH Conference on Motion in Games 2015 (MIG) At: Paris, France (Nov. 2015) 11 pages https://www.researchgate.net/publication/282335127_Reduced_Marker_Layouts_for_Optical_Motion_Capture_of_Hands.

* cited by examiner

SYSTEM AND METHOD FOR VIRTUAL CHARACTER ANIMATION USING MOTION CAPTURE

CROSS-REFERENCE TO RELATED APPLICATIONS

This application claims priority to United States Provisional Patent Application Ser. No. 63/108,779, filed on Nov. 2, 2020, the contents of which are incorporated herein by reference in their entirety and for all purposes.

FIELD

The present disclosure relates generally to video games, including methods and systems to implement the same, and more specifically, but not exclusively, to systems and methods for improved motion capture to efficiently render in-game objects, including characters, and controlling animation of characters and non-player characters.

BACKGROUND

Motion capture is the process of recording the movement of objects or people. For example, video games often use motion capture to animate athletes, martial artists, and other in-game characters. In video game development, motion capture comprises recording actions of human actors to animate digital character models in two-dimensional (2D) or three-dimensional (3D) space.

Conventionally, movements of one or more actors can be sampled many times per second, such as by using multiple cameras to calculate 3D positions. This animation data is then mapped to a 3D model to simulate the same actions as the actor. More specifically, conventional optical systems for motion capture use data captured from one or more image sensors to triangulate the 3D position of a subject between two or more cameras calibrated to provide overlapping projections.

Data acquisition is traditionally implemented using special markers attached to an actor. Objects with markers attached at known positions can be used to calibrate the cameras and obtain their positions. However, these conventional solutions cannot easily capture hand and finger motions.

The human hand is a complex organ that is an essential part of human form, function, and communication. Traditional computer graphics research on hand motion has simplified the complexity of skeletal control into grasping and gestures by identifying a limited number of points in the hand (e.g., bones and joints) that are 3D modeled to provide some level of animation control. Nevertheless, animating realistic hand motions remains a challenging task because it is difficult to capture realistic motions of the bones and joints.

In animation generally, a relatively small number of markers are typically placed on a body to be tracked using cameras to record the positions of these markers. Computer animation systems must not only capture data from these markers reflecting movements of the body, they also must translate the captured data to map it to parts of the 3D model to generate animated movement. For arms and legs, this is often done with an inverse kinematics (IK) method that applies constraints along a single chain of joints and appendages. However, a single chain cannot represent a multi-appendage limb like a human hand, which has constraints between joints of different chains. As such, marker-based solutions are conventionally limited to suitably tracking full body locomotion.

Adapting these full body solutions to track hand motion requires modifications to the size of the markers used, the distance from camera to markers, the number of cameras used, and so on. As a result, the modifications do not easily suit marker-based simultaneous capture of both hand and body movement. For example, hand markers can often be occluded or otherwise lost among the general movement of the body. Statistical analysis to select ideal marker placement and deep learning methods to better label captured markers have been suggested, such as described in "Reduced Marker Layouts for Optical Motion Capture of Hands," Schröder, Matthias & Maycock, Jonathan & Botsch, Mario (November 2015), which reference is hereby incorporated by reference in its entirety and for all purposes. However, despite selecting ideal marker placement and better labeling of captured markers, these improvements are still limited by drawbacks inherent to markers—the need to be visible to the camera, the distance from the camera, the size of the marker, the density of placement, and so on. In large capture settings where cameras are far from subjects and multiple subjects and props are in the capturing volume, these improvements are insufficient.

Wearable motion capture sensors that rely on capacitance-based sensing, for example, can provide additional data for motion capture. But this additional data introduces additional pros and cons. For example, a glove sensor fitted on an actor's hand can be used to capture finger/hand motions. The hand pose is retrieved from glove sensors by linear mapping or similarity matching (e.g., nearest neighbor look-ups) the data from the sensor to the corresponding model component. Compared to optical marker-based sensing, wearable motion capture sensors do not need to be visible to a camera. However, the precision of conventional wearable sensors is limited by the technology used (e.g., capacitance, inertial measurement units, and so on). An actor must also perform an initial calibration using known hand poses to map the sensor data to known hand positions. For example, an actor typically performs a series (e.g., about a dozen) of predetermined/static states (e.g., hand open, hand closed, one finger stretched, two fingers stretched, and so on). A calibration algorithm then maps the signal and the known poses, such as by using linear mapping or nearest neighbor lookups. These glove-based solutions also do not consider any additional inputs to perform the mapping.

As a further disadvantage of traditional glove-based solutions, actors must position sensors near each joint to identify the motion by the positions or angles between markers. For capturing hand motions, conventional sensors rarely cover all joints—instead, sensor data from a glove is typically captured per finger. And glove sensors don't always cover the entire finger (e.g., the glove sensors can stop well short of the entire finger length). But simply increasing the number of sensors to account for the number of ways in which a multi-appendage limb can satisfy a task does not make processing the data any easier. Instead, increasing the number of sensors needed on a user's finger also increases the noise that the sensors can produce, thereby confusing the processor. Because it is too difficult to disambiguate the acquired data points, the data is effectively useless.

Finally, some conventional depth-camera and markerless-based optical solutions that use machine-learning and deep-learning methods are discussed, for example, in "Depth-based hand pose estimation: data, methods, and challenges," Supancic III, James Steven; Rogez, Gregory; Yang, Yi;

Shotton, Jamie; Ramanan, Deva (2015), which reference is hereby incorporated by reference in its entirety and for all purposes. However, these solutions assume the actor is looking at their own hands (e.g., for virtual reality) or that a camera would be placed at a predetermined constant distance from their hands. These conventional solutions cannot accommodate actors that move around large spaces during capture such as to perform high velocity activities needed to model in-game characters.

Other conventional depth hand motion capture systems introduce other disadvantages. For example, accuracy is usually much lower than that of optical markers systems. These systems usually include two narrowly spaced cameras with a strict field of view (or mounted on a VR helmet) because the performance must occur inside such field of view, thereby restricting the natural movement of the actor. Finally, these conventional systems prevent manual post-processing of captured data to reduce problematic instances such as occurrence of noise or occlusions.

In view of the foregoing, a need exists for an improved system for motion capture to animate and control the motion of in-game objects in an effort to overcome the aforementioned obstacles and deficiencies of conventional video game systems.

Figure 1:
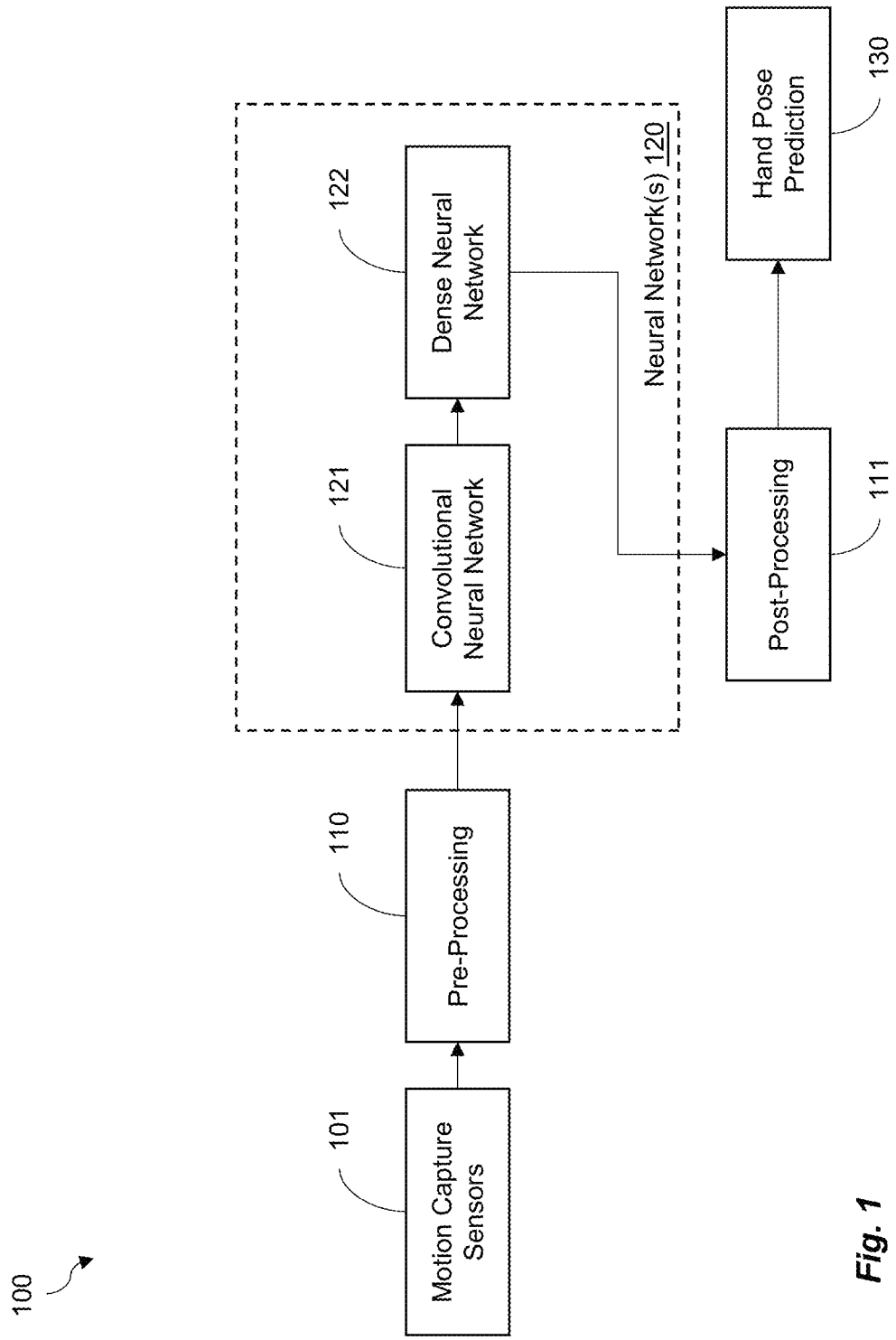
FIG. 1 is an exemplary top-level schematic diagram illustrating one embodiment of a motion capture system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF PREFERRED EMBODIMENTS

Because conventional video game motion capture systems cannot adequately capture complex and precise hand movements, an improved motion capture and animation system that can capture the subtleties of hand motion can prove desirable. For example, using machine learning feedback techniques provides a way to realistically animate a variety of complex finger positions and unique character movements. This result can be achieved, according to one embodiment disclosed herein, by a motion capture system 100 as illustrated in FIG. 1.

The motion capture system 100 advantageously overcomes the imprecision in conventional optical marker or sensor based motion capture of finger and hand movement. The motion capture system 100 includes a machine learning unit 120 that can take as inputs information about the hand pose of an actor from multiple sensors over a period of time and generate a highly probable hand pose prediction 130. In some embodiments, the hand pose prediction 130 represents the orientation (rotation) values for each of the joints in a body (hand) at each frame of the motion and is based on a previously captured dataset of high-quality sample motion captures. Advantageously, the motion capture system 100 learns patterns between input signals and hand poses (e.g., joint orientations) to synthesize poses from subsequent/novel input signals.

System Architecture

Turning to FIG. 1, the motion capture system 100 receives captured data from one or more motion capture sensors 101. The captured data is then pre-processed, for example, using one or more sensor pre-processors 110. A machine-learning and/or deep-learning unit phase, such as by implementing one or more neural networks 120, is used to analyze the pre-processed data and build a deep learning model (not shown). The deep learning model can be understood as a computational model that takes inputs and produces outputs, and is composed of multiple intermediary functions (also known as hidden layers) for which the parameters (also known as weights) are randomly initialized and the final desired parameters are learned as a function of optimizing for certain objectives. In some embodiments, the objective of the deep learning model is to produce a certain output given a determinate input.

The neural networks 120 can be advantageously comprised of one or more convolutional neural networks 121 and/or one or more dense neural networks 122. The results from the neural network 120 are then post-processed, for example, using one or more post-processors 111 and as described below. This post-processed data can represent the hand pose prediction 130.

Figure 2:
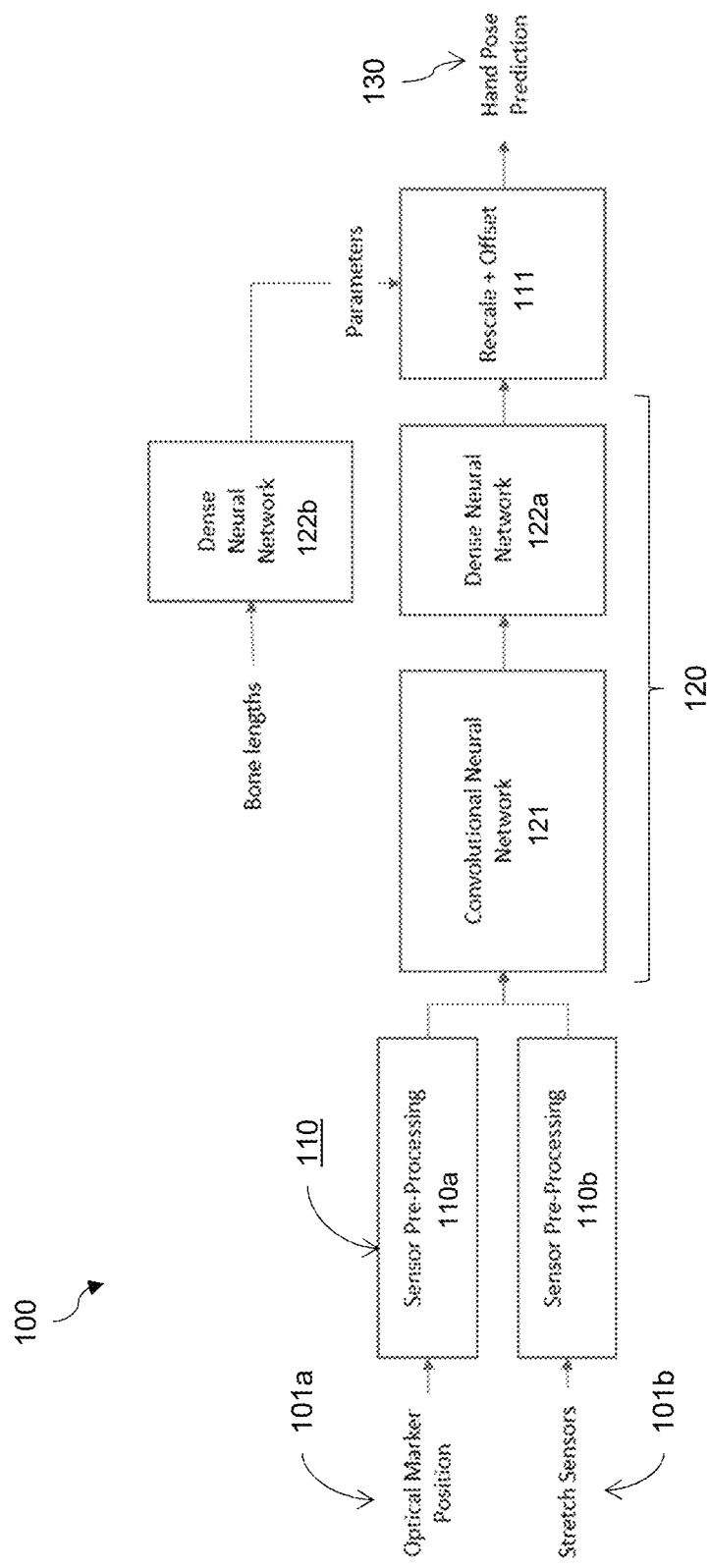
FIG. 2 is an exemplary schematic diagram illustrating another embodiment of the motion capture system of FIG. 1.
Figure 4A:
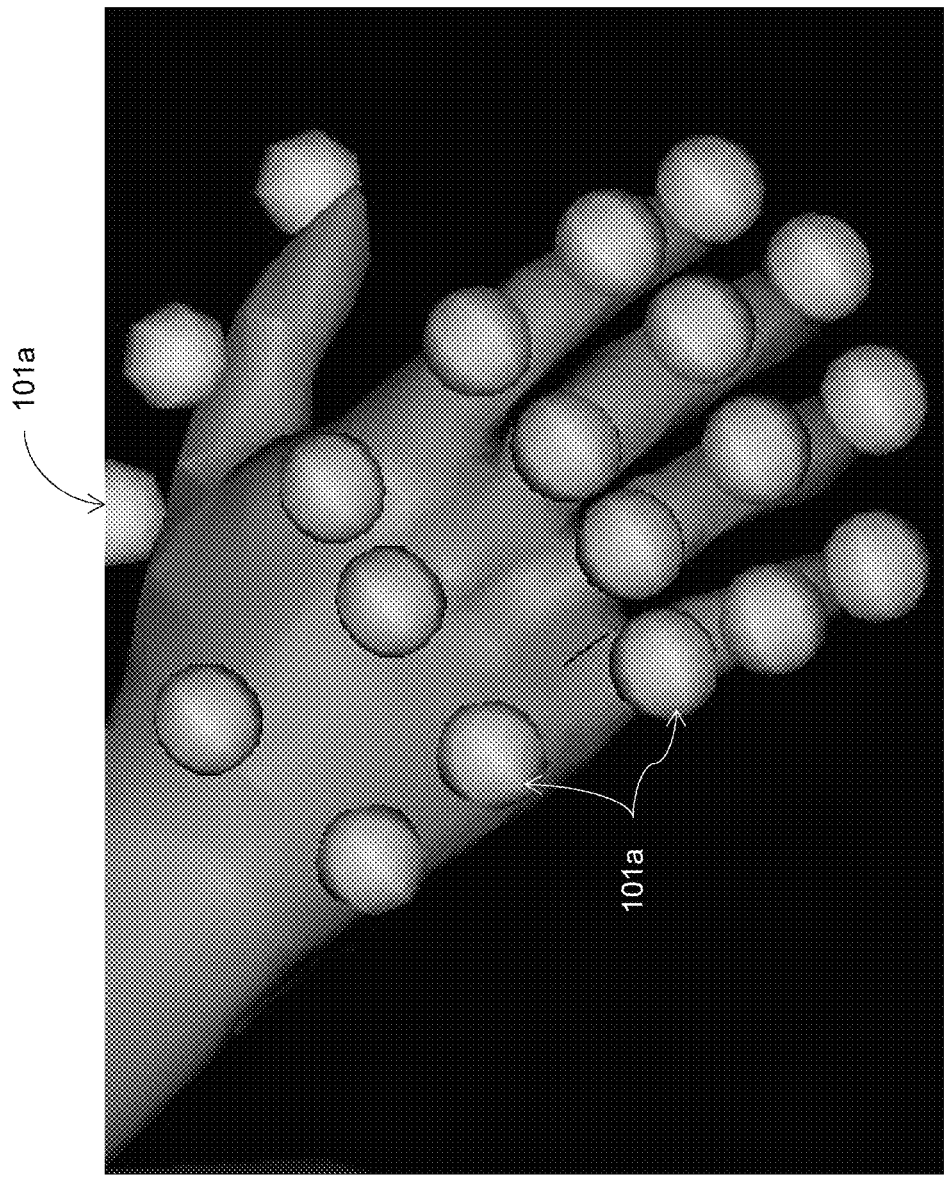
FIG. 4A is an exemplary diagram illustrating one embodiment of an optical marker for use with the motion capture system of FIG. 1.
Figure 4B:
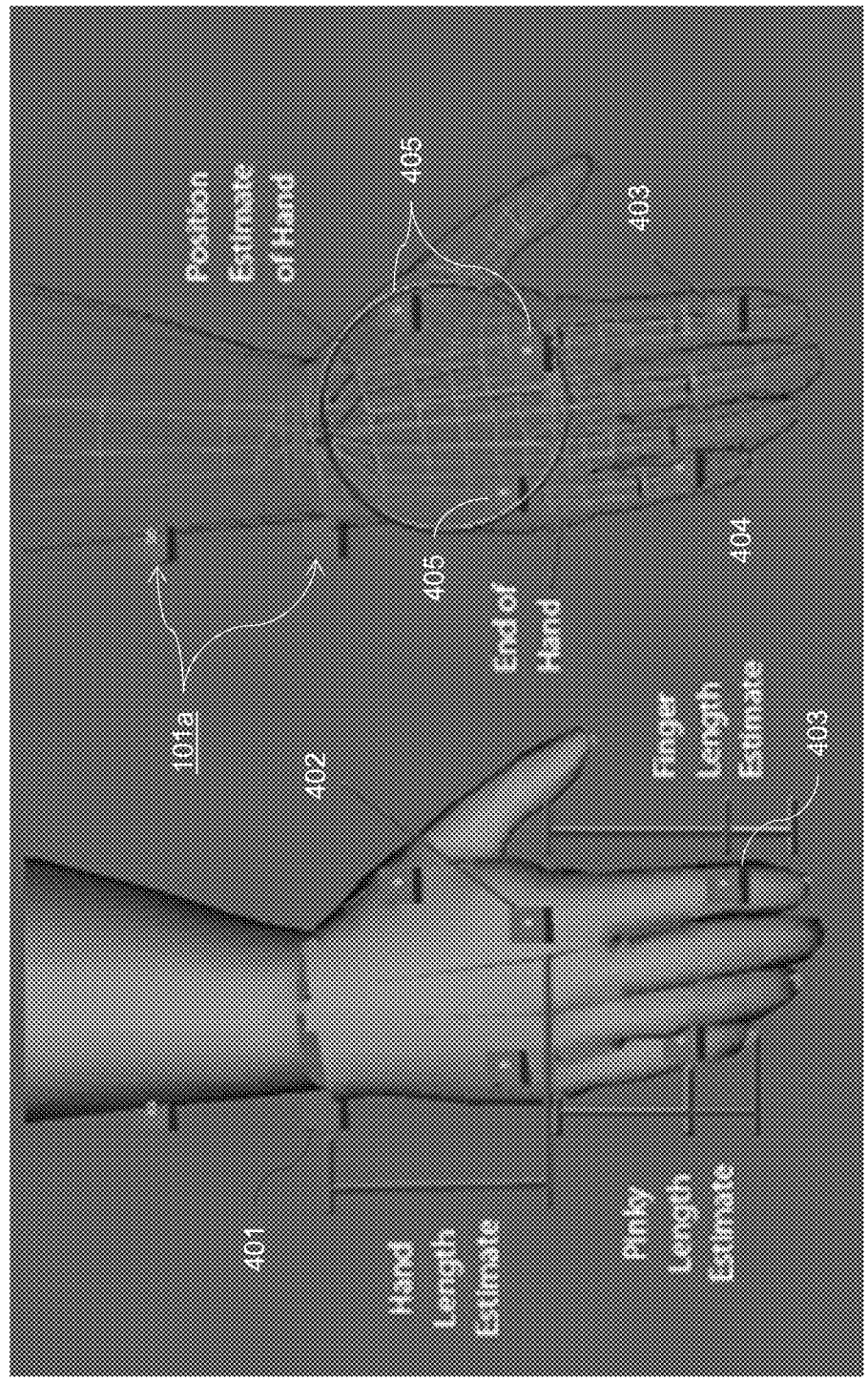
FIG. 4B is an exemplary diagram illustrating another embodiment of the optical marker of FIG. 4A.
Figure 4C:
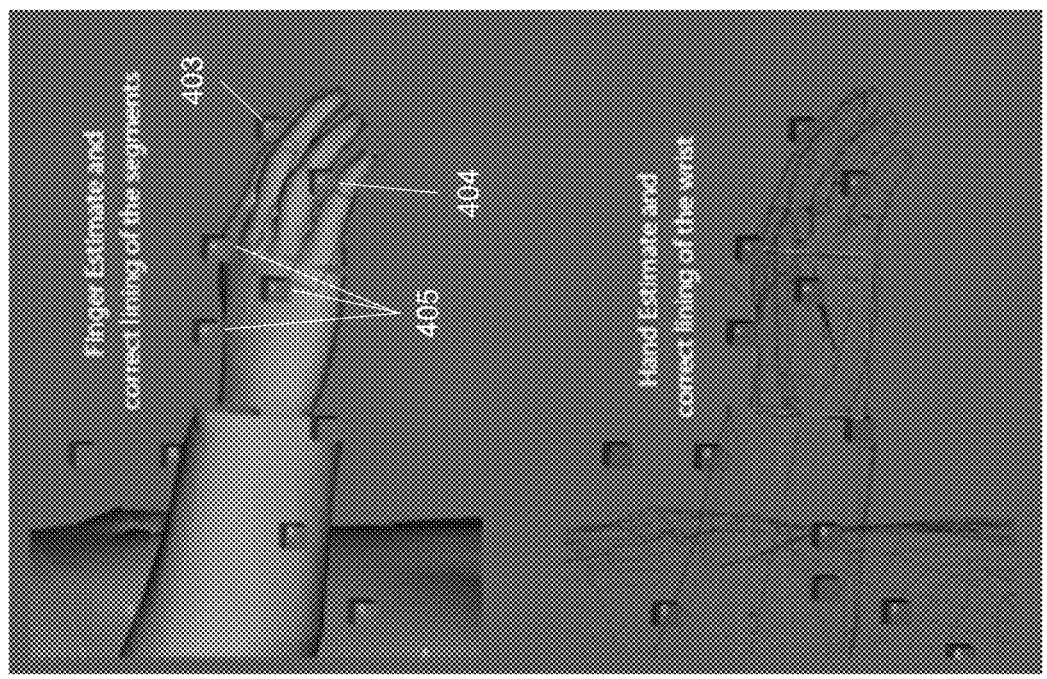
FIG. 4C is an exemplary diagram illustrating another embodiment of the optical marker of FIG. 4A.

The motion capture system 100 can take as input any number or type of sensors. FIG. 2 illustrates an exemplary detailed view of the motion capture system 100 shown in FIG. 1. The one or more motion capture sensors 101 can include one or more optical markers 101a, which can be read by cameras, and one or more wearable sensors 101b (such as shown in FIGS. 4A-C). For example, the optical markers 101a can include passive markers, which can be coated with a retroreflective material to reflect light to a camera lens, or active markers, which can be powered to emit their own light rather than relying on reflected light.

Additionally and/or alternatively, the wearable sensor 101b comprises a glove-based sensor system that includes at least one sensor on at least one finger, preferably all fingers, to detect bend and splay. By way of example, one or more stretch sensors can be placed on each finger, each sensor communicates with a central circuit board in a root portion of the glove. Each stretch sensor can have a capacitance and resistance formed by stretchable electrodes sandwiching a dielectric. The degree of the stretch can then be measured by the circuit board by determining the capacitance and/or resistance in each sensor as it is stretched.

In some embodiments, a single stretch sensor is positioned on an index finger of a user to determine the splay of the index finger (e.g., based on the elasticity or flexibility of selected portions of the sensor).

The glove-based sensor can additionally include an accelerometer, a gyroscope, and any other complementary sensors in operable communication with each sensor and/or the circuit board as desired. The glove-based sensor can also be powered by wire and/or a battery (not shown).

Although described as having a sensor on each finger, the number of wearable sensors 101b can vary per application. For example, during a video game motion capture, one wearable sensor 101b per finger with two additional wearable sensors 101b on a palm region of a glove can be used. In another embodiment, three wearable sensors 101b can be used with an inertial measurement unit (IMU) (not shown)—for example, comprising an accelerometer, a gyroscope, and so on. The accelerometer and gyroscope are particularly suited to determine the movement of the hand itself (compared to just the fingers). Those of ordinary skill in the art understand that any suitable number of sensors may be beneficial for other applications. And that the wearable sensors 101b are not limited to glove sensors.

In some embodiments, adding more wearable sensors typically enables a more granular registration of the movements of each single joint. However, for conventional motion capture systems, more sensors impose drawbacks such as 'bleeding' across sensor activations, additional error accumulation at extremities, and complex manufacturing and maintenance processes. Accordingly, the motion capture system 100 advantageously supplements the number of sensors with additional data sources (e.g., optical markers) to keep the number of wearable sensors to a reasonable number where the impact of such drawbacks is low, while the accuracy of the solver is still high.

In a preferred embodiment, the acquired data from the one or more sensors 101 includes at least data from a sparse set of optical markers (e.g., the optical markers 101a), the raw signal from the wearable sensors 101b, and data representing the lengths of an actor's hand bones.

With reference to FIG. 4B, the length of an actor's hand bones can be approximated by the placement of the sparse set of optical markers, such as the optical markers 101a, which can be read by cameras. In some embodiments, the length of the actor's hand bones can be inputted to the motion capture system 100 by a user interface (not shown). Additionally and/or alternatively, a hand length can be determined by a distance of a wrist marker 401 to a pointer finger knuckle marker 402 on the hand. A finger length can be determined by the distance of the pointer finger knuckle marker 402 and a pointer finger marker 403. In some embodiments, the finger length estimate can be used to approximate all other fingers except the pinky finger. Instead, a pinky finger length can be estimated by the end of the hand to a pinky finger marker 404. To estimate the rotation and position of the hand, three rotation markers 405 can be used, as also shown in FIGS. 4B-C. For example, the three rotation markers 405 can also be used to determine the end of the hand. Although seven optical markers 101a are shown and described here for exemplary purposes, it should be appreciated that any number of optical markers 101a can be used as desired. In a preferred embodiment, at least three optical markers 101a are used to estimate the orientation of the palm; however, additional optical markers 101a can be added as desired.

Advantageously, supplementing data from the optical markers 101a with data from wearable sensors 101b and other measurements (e.g., the lengths of the hand bones) enables the motion capture system 100 to leverage non-optical performance capture input—for example, from gloves—and machine learning techniques to provide a better solver in performance motion capture as well as a more intuitive input for animators. For example, such a system allows an animator to use a glove to create hand poses at their desks. In contrast to conventional solutions that rely only on optical markers, the motion capture system 100 can match this newly captured glove data with supplemental input (e.g., other sensors as well as optical data that was previously captured).

Returning to FIG. 2, the motion capture system 100 can normalize sensor data from the one or more optical markers 101a, such as by using an optical marker sensor pre-processor 110a can be used. The optical marker sensor pre-processor 110a can include a set of instructions, for example, encoded in memory that can be executed by a processor to perform the tasks described.

Figure 3A:
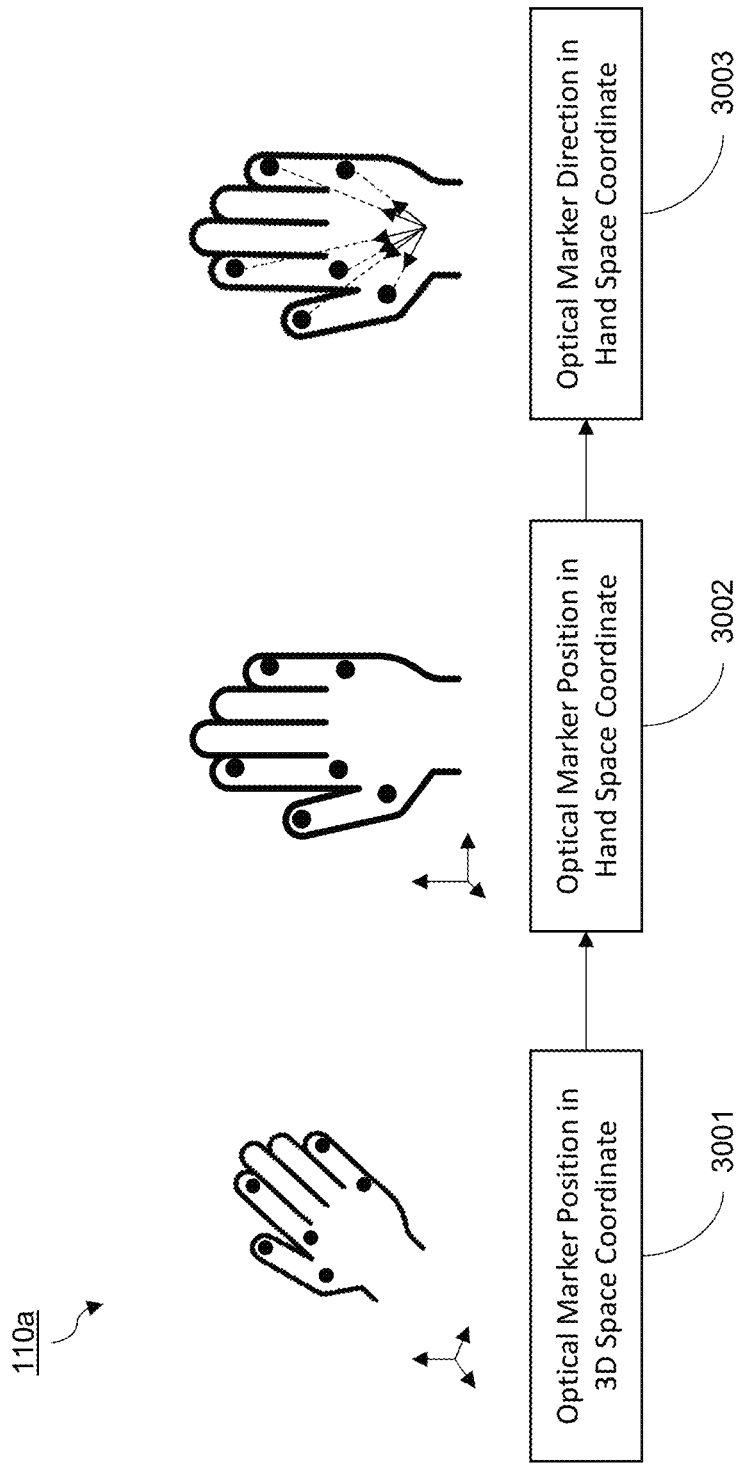
FIG. 3A is an exemplary flow diagram illustrating one embodiment of data flow using the sensor pre-processors of FIG. 1.
Figure 3B:
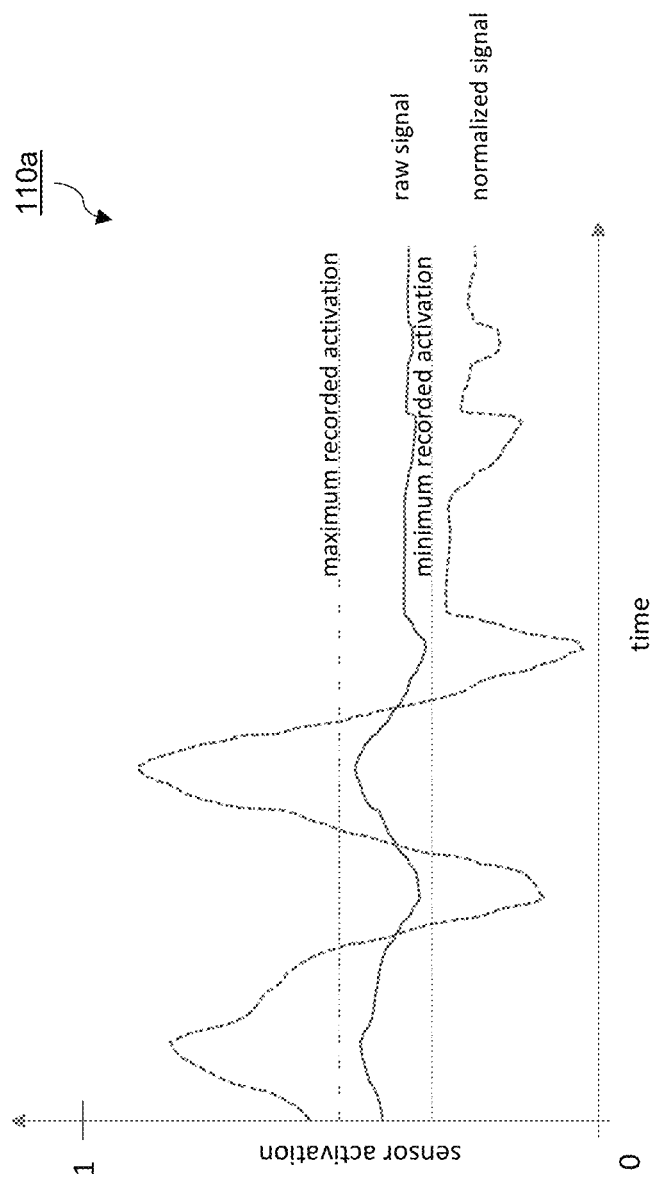
FIG. 3B is an exemplary flow diagram illustrating another embodiment of the data flow of FIG. 3A.

Turning to FIGS. 3A-B, a functional flow diagram for use with the optical marker sensor pre-processor 110a is shown. In some embodiments, the optical marker sensor pre-processor 110a generates hand position data that represents offsets to the hand palm. As shown in FIG. 3A, the optical marker sensor pre-processor 110a receives the sensor data from the one or more optical markers 101a (at 3001). In some embodiments, the optical markers 101a provide marker position data in global three-dimensional coordinates. The optical marker sensor pre-processor 110a encodes these global three-dimensional coordinates to coordinates in hand space (at 3002). For example, the three-dimensional coordinates can be transformed by an inverse matrix of hand orientation. In some embodiments, the hand orientation is derived from the optical markers 101a that are used to estimate the orientation of the palm (e.g., the three rotation markers 405).

Using the transformed optical marker position in the hand space, position vectors can be scaled to unit length to determine an optical marker direction in the hand space (at 3003). As shown in FIG. 3A, three-dimensional (3D) vectors of a unit length having an origin at the palm of the hand (specifically, the wrist) pointing in the direction of each marker can be used. Scaling these vectors advantageously highlights the directional aspect of the optical marker data with reference to the hand being measured rather than the length of the marker data that will vary with hand size.

Additionally and/or alternatively, when normalizing sensor data from the one or more wearable sensors 101b, a wearable sensor pre-processor 110b can be used. Instead of representing offsets to the hand palm, the received sensor data—in its raw form—is rescaled based on a minimum and maximum activation detected from a range of motion capture, such as shown in FIG. 3B. For example, an actor can perform any number of extreme poses (e.g., open, close, splay, fingers stretched) using the wearable sensors 101b to determine the range of motion. In other words, a minimum and maximum value for each sensor can be determined to normalize the data in the following manner: raw_data−minimum/(maximum−minimum).

In a preferred embodiment, the sensor pre-processors 110 are implemented in Python and NumPy. The sensor pre-processors 110 advantageously normalize the data coming from similar, but different, sources (e.g., the one or more optical markers 101a and the one or more wearable sensors 101b) as well as from differently sized subjects. Accordingly, the motion capture system 100 can operate with actors of any shape and size.

With reference again to FIG. 2, machine-learning and/or deep-learning can be implemented using the one or more neural networks 120 to analyze the data that has been processed by the sensor pre-processors 110. The neural networks 120 can include one or more convolutional neural networks 121 and/or one or more dense neural networks 122. As shown in FIG. 2, the convolutional neural network 121 can be embodied by a one-dimensional convolutional neural network. In deep learning, this one-dimensional convolutional neural network is also referred to as a shift invariant or space invariant artificial neural network, based on a shared-weights architecture and translation invariance characteristics. The one-dimensional convolution is often referred to as a time delay neural network.

The convolutional neural network 121 generates a learning model that can detect patterns that are relevant over a certain time window. This is particularly advantageous for hand pose estimation where in cases of uncertainty, the current subject's pose can be more likely determined if the learning model understands the previous states of the sensors. The size of the time window that is sampled from the sensors is adjustable. In a preferred embodiment, the default for this window is about ~0.5 s (32 frames of a 60 fps sequence).

The input feature dimensions depend on the size of data from the sensors 101 after being pre-processed by their respective pre-processors 110. For example, each of the optical markers 101*a* can generate three inputs (e.g., x, y, and z positions in three-dimensional space) and each of the wearable sensors 101*b* can generate three. The combination of signals from all the sensors 101 over the aforementioned time window composes a matrix with as many columns as there are sensor signals and as many rows as the number of frames in the window. By way of example, for an embodiment with six optical markers 101*a* and five sensors 101*b*, and a window of 32 frames, the input is a matrix with 33 columns and 32 rows. The number of convolution blocks in the convolutional neural network 121, the size of the convolution, and the number of filters per block are adjustable parameters. For example, four convolution blocks with thirty-two filters per block and a convolution of size six is reasonably suited for hand motion capture with the previously mentioned number of optical markers and stretch sensors as inputs.

The motion capture system 100 can also cooperate with one or more dense neural networks 122. FIG. 2 illustrates a hand pose dense neural network 122*a* and a hand scale dense neural network 122*b*. The hand pose dense neural network 122*a* takes as inputs the outputs of the convolutional neural network 121 (e.g., matrices representing hidden layers) and outputs the hand pose prediction 130. The hand pose dense neural network 122*a* analyses the outputs from the convolutional neural network 121 to determine the hand pose at a single point in time, the current frame. The input size of this neural network 122*a* is equal to the output size of the convolutional neural network 121. The number of hidden layers and the number of neurons per layer are adjustable parameters. For example, four hidden layers and two hundred fifty six neurons per layer is one suitable arrangement.

The hand scale dense neural network 122*b* learns a mapping from the subject's hand bone lengths to scale and offset parameters that will be then used by the post-processors 111 to modify the pose predicted by the hand pose dense neural network 122*a*. The input size of the hand scale dense neural network 122*b* varies with the number of measurements taken from the subject's hand bones' lengths. In some embodiments, there is one number per bone; however, fewer than all bones can be used for a less accurate approximation. Therefore, for a hand model with nineteen bones, the preferred input size would be nineteen. The number of hidden layers and the number of neurons per layer are adjustable parameters. For example, three hidden layers and two hundred fifty six neurons per layer can be used. The number of outputs is twice the number of outputs of the hand pose dense neural network 122*a*.

Returning again to FIG. 2, the results from the neural networks 120 are then post-processed, for example, using the one or more post-processors 111. As shown in FIG. 2, the post-processor 111 is shown as a hand pose re-scale and offset processor. Compared to the sensor pre-processors 110 that remove subject specific behavior such that the neural networks 120 are only capable of inferring the pose for a generic hand of average size, the post-processor 111 can rescale and offset the hand pose based on a mapping learned by the hand scale dense neural network 122*b*. Rescaling happens individually for each component of the output of the hand pose dense neural network 122*a*. In some embodiments, the rescaling can be computed in the following manner: $p*s+o$, where p is a pose component of the hand pose dense neural network 122*a* and s (scale) and o (offset) are outputs of the hand scale dense neural network 122*b*.

The output of the deep learning model is the hand pose prediction 130. The pose can be encoded in different ways, such as the 3D cardinal positions of each joint or the quaternion orientations of each joint. By way of example, the hand pose prediction 130 can be represented as rotation matrices for each joint, as a rotation matrix in a three-dimensional space is a matrix with three rows and three columns, the total number of outputs for the model of a hand with nineteen joints would be nineteen three by three matrices.

The motion capture system 100 can provide at least two modes of operation: a training mode and an inference mode.

Training Mode

In the training mode, the deep learning model of the neural networks 120 consumes a dataset of captured sensor signals and motion captured hand poses. The motion capture system 100 can then train against a ground truth to correlate received sensor data from the sensors 101. In some embodiments, the ground truth embodies the training dataset (which is composed of inputs and outputs) for the deep learning model of the neural networks 120. Stated in another way, the ground truth is the expected positional result in 3D space of the user's hand position. For example, in one preferred embodiment, the ground truth can be established through optical tracking using a properly configured and positioned optical tracking system. Accordingly, the ground truth of the disclosed motion capture system 100 can be based on both optical markers and wearable sensors to be particularly advantageous compared to conventional systems in terms of accuracy, freedom of actor movement, and reduction of noise. For example, the sensors readings from all sensors 101 can be time-synchronized. In other words, the time synchronization of the motion capture system 100 is across different sources. Actor movements are also not limited by the field of view. The ground truth positional data from the optical system is then defined as the expected output correlated with the corresponding inputs from the sensors 101. Because this optically generated ground truth data is only used for the limited purpose of training, the system and the user's proscribed poses can be specifically set up to avoid many of the deficiencies of the optical tracking hand movements discussed above.

Other mechanisms of generating ground truth would be readily understood by persons of skill in the art, such as using red-green-blue (RGB) and RGB plus depth (hereafter RGB+) motion capture systems or even having the user mimic hand poses generated on a screen.

For example, the model can use a backward-propagation algorithm to update the weights of the neural networks 120. The training is done in an end-to-end fashion, meaning that even though the model is composed of different neural networks 120, the back-propagation is performed in the full architecture at each training iteration, and not on each network independently. The optimization for the back-propagation include: the minimization of the error between the network's outputs and the original values in the dataset, and the minimization of the derivatives of adjacent frames. The first objective ensures a good pose prediction for a given set of input signals while the second objective helps reduce the noise in-between predicted frames.

Compared to conventional calibration, the training mode of the motion capture system 100 can advantageously receive a continuous signal from the motion capture sensors 101, accompanied by the corresponding hand poses captured with an optical marker system under very optimal conditions, such as described herein (e.g., more and smaller markers, more sensors, more cameras, closer cameras, and so on). The motion capture system 100 can use minutes or hours of data sampled at very high rates (e.g., 60 Hz) to train the deep learning model. As an additional advantage, poses need not be predetermined as long as the actors can cover a large range of motion. As further described, below, mapping from the input signals to the desired inputs and output (ground truth data) is done using the deep learning model that leverages non-linear and temporal relations of the data.

The quality of the predictions in the inference mode can be tightly related to the quality, quantity, and variety of the data consumed during the training mode (e.g., more markers, more sensors, more cameras, closer cameras, and so on). When capturing the data to train the model, a dense set of optical markers to capture bone positions and orientations can use one marker per finger joint with additional markers for the hand palm; smaller sized optical markers can be used; and a more densely packed camera volume can also be used. The hand poses may also include fixes (e.g., removing noisy marker signals or occlusions) introduced by domain experts such as animators and motion capture technicians. However, these fixes do not include stylistic changes to the movement.

During the training mode, the motion capture system 100 can be trained against a continuous solver based on the ground truth. Accordingly, in some embodiments, each sensor 101 need not provide the same type of motion capture data nor does the data need to be perfectly reliable. For example, using conventional glove-based sensors, capacitance can vary with area and thickness of the material. Similarly, the data may represent positional or rotational data or may be integrated with other information (e.g., splay can be combined with a bend of root joint measurement and mid joint bend can be combined with root joint blend measurement). The motion capture system 100 can advantageously correlate the data from the one or more sensors 101 with the ground truth.

In some embodiments, to collect a training dataset composed of desired inputs and outputs, an actor can be fitted with a predetermined number of markers and/or sensors, such as shown in FIG. 4A. For example, with reference to FIG. 4A, the actor can be fitted with a first number of wearable sensors 101b (not shown) as well as a second number of the optical markers 101a. The second number of optical markers 101a is typically a subset of the dense set of markers described herein. The actor can then model several different poses to capture the ground truth. The motion capture system 100 can advantageously leverage this ground truth to build a continuous solver, as described herein. Specifically, the motion capture system 100 can train the neural networks 120 against this ground truth.

The training above teaches the neural networks 120 to map data from the sensors 101 to the ground truth. Accordingly, the motion capture system 100 can rely on data from the wearable sensors 101b and/or supplement this data with data from the optical markers 101a. In some embodiments, the neural networks 120 can cooperate with the one or more sensors 101, such as shown in FIG. 2.

With reference again to FIG. 2, the motion capture system 100 first receives sensor data to be trained on the neural networks 120. As shown, the motion capture system 100 receives sensor data from the one or more optical markers 101a and the one or more wearable sensors 101b. The captured data is then pre-processed, for example, using one or more sensor pre-processors 110. Normalizing these differences enable the neural networks 120 to better generalize the results across different sensors and subjects. The exact operations involved in such normalizations can vary with the type of sensor itself.

Inference Mode

In the inference mode, the model consumes novel sensor signals and generates high quality hand pose predictions. In other words, in the training mode, the deep learning models are fed both inputs and outputs to train the models. In the inference mode, the deep learning model is fed inputs to generate the desired outputs.

Since the generated outputs include motion capture of the hands in a preferred embodiment, such data can be combined with body movement data provided by an optical marker system, either in real-time, by streaming the generated results to the optical marker system via a software API, or as a post-process via said API or by directly writing the outputs to a file.

In a preferred embodiment, the neural networks 120 are defined and trained using Tensorflow and the Keras API. However, PyTorch, Mxnet, Apache Spark, or any other dep learning framework can be used.

Translation Mode

In some embodiments, movement of an in-game character is based on the hand pose prediction 130 from the motion capture system 100. By way of example, the hand pose prediction 130 comprises hand poses described as rotation matrices. These rotation matrices drive a virtual skeleton of an in-game character. Where the number of joints of the in-game character can be equal to the number of joints defined by the motion capture system 100, those of ordinary skill in the art would understand that the rotation matrices can be directed fed to the virtual character model.

Additionally and/or alternatively, the motion capture system 100 can generate positions of the extremities of fingers based on the hand pose prediction 130 and the approximate hand measurements from various sensors 101 (such as shown in FIGS. 4B-C). These positions of the extremities of the fingers can be used to drive an inverse kinematics-based process to solve for the actual orientations for the joints of the in-game character. In other words, using the orientation matrices generated by the motion capture system 100 and the approximated length of each actor's bones, using forward kinematics, the root and end position of all bones can be determined. These root and end positions can be used directly to animate the in-game character and/or rescale positions to the proportions of a new in-game character. For example, a fast, iterative solver for the inverse kinematics problem—such as a heuristic Forward And Backward Reaching Inverse Kinematics (FABRIK) method—can be used with multiple end effectors.

The application of movements to in-game characters described herein can occur in virtual production, in-game, locally, remotely, live, or as a post-processing step to pre-recorded data as desired.

In-Game Usage

Additionally and/or alternatively, aspects of a video game often impose constraints to the outputs of a motion capture system, such as the motion capture system 100, to situate the actor's movements within the virtually defined world.

By way of example, the video game may include a collision detection method against the virtual environment (e.g., buildings, props, other players, non-player characters). Once the body of a character controlled by the motion capture system 100 is on a collision course with other video game elements of the virtual environment, the motion capture system 100 can be used to determine a proportional offset in rotation and translation, which offset is applied to the in-game character to remove interpenetrations.

Similarly, the motion capture system 100 can be used to force contact against a virtual surface. For example, this is particularly advantageous where an actor mimics handling an asset in the real world to match a virtual asset of the in-game story (e.g., a steering wheel of a car). In this example, the motion capture system 100 receives the sensor data during the inference mode. The outputs of the motion capture system 100 are used to drive the orientation of the joints of the in-game character. A video game engine determines the proximity between the surface of the in-game character and the surface of a prop or environment object that was used to capture the actor's motions (e.g., the steering wheel). If the distance of the in-game character's hand to the steering wheel is within a predetermined threshold, a transformation can be applied to the original output of the motion capture system 100. Advantageously, this transformation can cause the fingers of the virtual character to grip the virtual steering wheel by slightly increasing the rotation in each joint so that the surface of the in-game character's fingers touch the surfaces of the virtual steering wheel. This transformation can similarly accommodate limitations imposed by injuries (e.g., limiting range of motion), changes in orientation (e.g., upside-down characters) or gravity, changes in speed (e.g., characters thrown by a high-velocity vehicle collision), and so on.

Whilst such object interactions can individually degrade the quality of the input data of both optical markers, due to occlusions, and wearable sensors, due to deformation, the coupled use of two or more sensor sources, in combination with the statistical data prior approximated by the machine learning model helps ease the drawbacks associated with each single data source.

Figure 5:
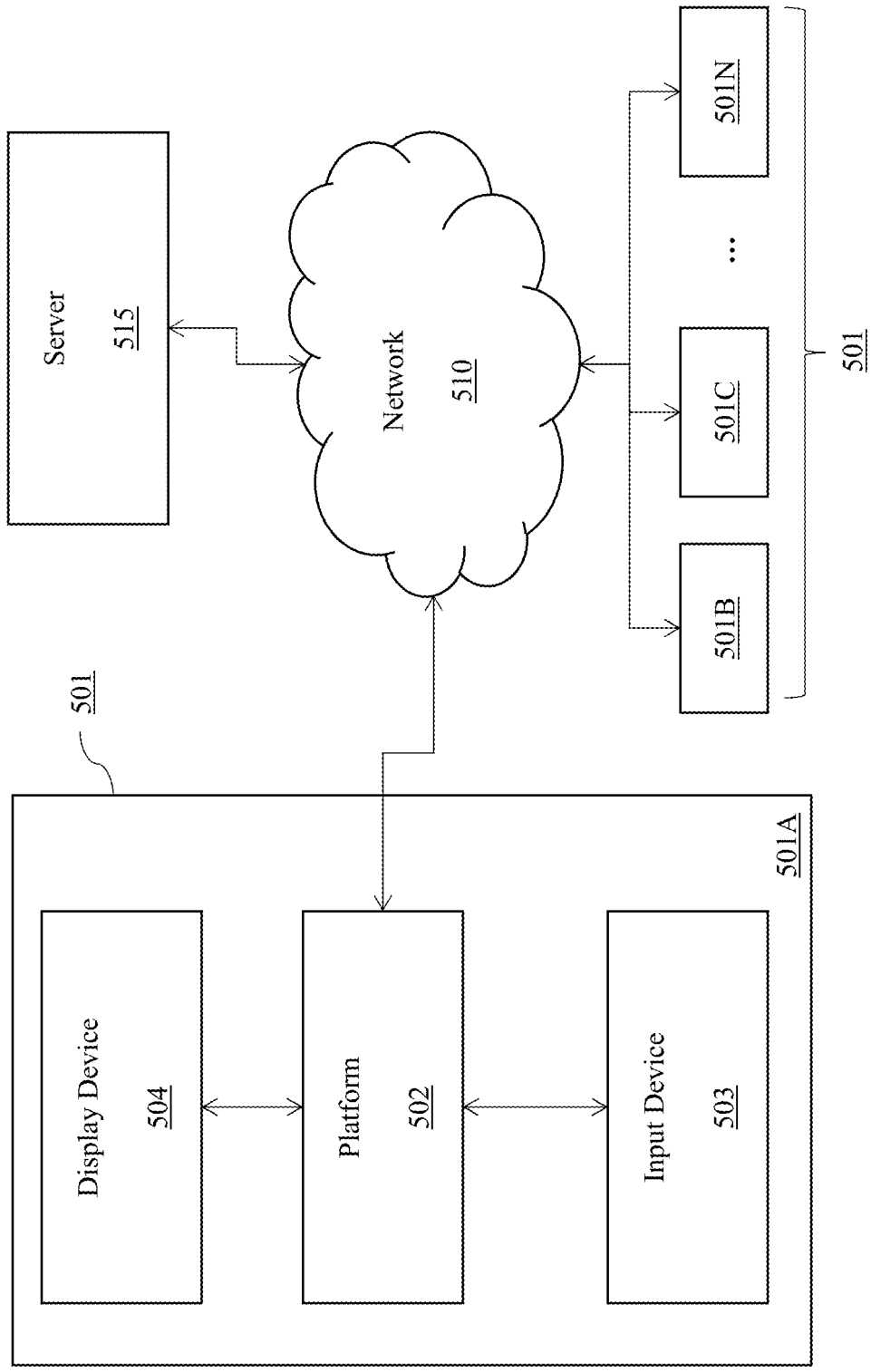
FIG. 5 is an exemplary top-level block diagram illustrating one embodiment of a network multiplayer gaming environment including at least one peer device for implementing the motion capture system of FIG. 1.

Turning to FIG. 5, the motion capture system 100 can be implemented between a network 510 (e.g., cloud) comprising a server 515 (e.g., a single server machine, multiple server machines, and/or a content delivery network) communicating with a plurality of player consoles 501 (shown as any number of player consoles 501A-501N). A player console 501 can be any system with a processor, memory, capability to connect to the network, and capability of executing gaming software in accordance with the disclosed embodiments. A hardware and network implementation suitable for the disclosed system is described in greater detail in commonly assigned U.S. Pat. No. 9,901,831, entitled "System and Method for Network Gaming Architecture," incorporated herein by reference.

The player console 501A is shown in further detail for illustration purposes only. As shown, the player console 501 can include any number of platforms 502 in communication with an input device 503. For example, the platform 502 can represent any biometrics, motion picture, video game, medical application, or multimedia platform as desired. According to one embodiment disclosed herein, the platform 502 is a gaming platform for running game software and various components in signal communication with the gaming platform 502, such as a dedicated game console including an XBOX One®, XBOX One X®, and/or XBOX One S® manufactured by Microsoft Corp., PLAYSTATION 4® and/or PLAYSTATION 5® manufactured by Sony Corporation, and/or WII U® manufactured by Nintendo Corp. In other embodiments, the platform 502 can also be a personal computer, laptop, tablet computer, or a handheld mobile device. One or more players can use a gaming platform to participate in a game. Multiple gaming platforms may be linked together locally (e.g., via a LAN connection), or via the network 510 (e.g., the Internet or other communication networks).

The network 510 can also include any number of wired data networks and/or any conventional wireless communication network, for example, radio, Wireless Fidelity (Wi-Fi), cellular, satellite, and broadcasting networks. Exemplary suitable wireless communication technologies used with the network 510 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The platform 502 typically is electrically coupled to a display device 504. For example, the display device 504 can be an output device for presentation of information from the platform 502 and includes a television, a computer monitor, a head-mounted display, a broadcast reference monitor, a medical monitor, the screen on a tablet or mobile device, and so on. In some embodiments, the platform 502 and/or the display device 504 is in communication with an audio system (not shown) for presenting audible information.

In FIG. 5, the platform 502 also is electrically or wirelessly coupled to one or more controllers or input devices, such as an input device 503. In some embodiments, the input device 503 is a game controller and includes keyboards, mice, gamepads, joysticks, directional pads, analog sticks, touch screens, and special purpose devices (e.g., steering wheels for driving games and/or light guns for shooting games). Additionally and/or alternatively, the input device 503 includes an interactive-motion-tracking system, such the Microsoft Xbox One or One S KINECT® device or the Sony PlayStation 4/Sony PlayStation 5 Camera®, for tracking the movements of a player within a 3-dimensional physical space. The input device 503 provides data signals to the platform 502, which processes the data and translates the player's movements on the display device 504. The platform 502 can also perform various calculations or operations on inputs received by the sensor and instruct the display to provide a visual representation of the inputs received as well as effects resulting from subsequent operations and calculations.

In one embodiment, the platform 502 can be connected via the network 510 to the server 515 that can host, for example, multiplayer games and multimedia information (e.g., scores, rankings, tournaments, and so on). Users can access the server 515 when the platform 502 is online via the network 510. Reference herein to the platform 502 can include gaming platforms executing video game software or game software (e.g., computer program products, tangibly embodied in a computer-readable storage medium). Additionally and/or alternatively, references to the platform 502 can also include hardware only, or a combination of hardware and/or software. In some embodiments, the platform 502 includes hardware and/or software, such as a central processing unit, one or more audio processors, one or more graphics processors, and one or more storage devices.

In some embodiments, a selected player console 501A-N can execute a video game that includes animation of one or more virtual players in a virtual world and at least one non-player object (NPC). NPCs can include, for example, cars, boats, aircrafts, and other vehicles in the virtual world. The virtual world can include game spaces with these NPCs and player characters that are animated using the systems and methods described herein.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

The invention claimed is:

1. A system for motion capture of an actor to estimate a hand pose prediction of the actor for rendering a three-dimensional (3D) virtual environment, comprising:
   one or more sensor pre-processors to receive raw motion capture data from at least one wearable sensor and at least one optical marker-based sensor and to normalize the received raw motion capture data;
   a convolutional neural network to receive the normalized motion capture data from the sensor pre-processors and to generate a learning model to detect one or more patterns over a predetermined time window, the detected patterns being encoded by a matrix;
   a hand pose dense neural network for receiving a measurement of bone length from the actor and the matrix of the convolutional neural network to determine an intermediate hand pose prediction at a selected point in time;
   a hand scale dense neural network for receiving outputs from the convolutional neural network to learn a mapping of the received measurement of bone lengths and the determined intermediate hand pose prediction; and
   a post processor for rescaling and offsetting the determined intermediate hand pose prediction based on the learned mapping to generate the hand pose prediction.

2. The system of claim 1, wherein the one or more sensor pre-processors normalize the received raw motion capture data by generating one or more position vectors that are scaled to unit length to determine an optical marker direction in hand space.

3. The system of claim 1, wherein the convolutional neural network comprises a shift invariant artificial neural network.

4. The system of claim 1, wherein the wearable sensor includes a glove-based sensor system that includes at least one sensor for at least one finger of a hand of the actor.

5. The system of claim 1, wherein the hand pose dense neural network receives the measurement of bone length from the actor from the at least one optical marker-based sensor.

6. The system of claim 1, wherein the one or more sensor pre-processors normalize the received raw motion capture data based on a minimum and a maximum value for each of the wearable sensors and each of the optical marker-based sensors.

7. The system of claim 6, wherein the one or more sensor pre-processors normalize the received raw motion capture data by, for each value of the received raw motion capture data, dividing a difference between each value of the received raw motion capture data and the minimum value by a difference between the maximum and minimum value.

8. The system of claim 1, wherein the generated hand pose prediction comprises one or more rotation matrices.

9. The system of claim 1, wherein the 3D virtual environment is a video game.

10. A computer-based method for motion capture of an actor to estimate a hand pose prediction of the actor for rendering a three-dimensional (3D) virtual environment, comprising:
    receiving raw motion capture data from at least one wearable sensor and at least one optical marker-based sensor;
    normalizing the received raw motion capture data via one or more sensor pre-processors;
    receiving the normalized motion capture data from the sensor pre-processors via a convolutional neural network;
    generating a learning model via the convolutional neural network to detect one or more patterns over a predetermined time window, the detected patterns being encoded by a matrix;
    receiving a measurement of bone length from the actor and the matrix of the convolutional neural network via a hand pose dense neural network;
    determining an intermediate hand pose prediction at a selected point in time via the hand pose dense neural network based on the received measurement of bone length and the matrix of the convolutional neural network;
    learn a mapping of the received measurement of bone lengths and the determined intermediate hand pose prediction via a hand scale dense neural network based on the outputs from the convolutional neural network; and
    rescaling and offsetting the determined intermediate hand pose prediction based on the learned mapping via a post processor to generate the hand pose prediction.

11. The method of claim 10, further comprising normalizing the received raw motion capture data by generating one or more position vectors that are scaled to unit length via the one or more sensor pre-processors to determine an optical marker direction in hand space.

12. The method of claim 10, wherein said generating the learning model comprises generating the learning model via a shift invariant artificial neural network to detect the one or more patterns over the predetermined time window.

13. The method of claim 10, wherein said receiving the raw motion capture data from the at least one wearable sensor and the at least one optical marker-based sensor includes receiving the raw motion capture data from a glove-based sensor system that includes at least one sensor for at least one finger of a hand of the actor.

14. The method of claim 10, wherein said receiving the measurement of bone length from the actor comprises receiving the measurement of bone length from the at least one optical marker-based sensor.

15. The method of claim 10, wherein said normalizing the received raw motion capture data comprises normalizing the received raw motion capture data based on a minimum and a maximum value for each of the wearable sensors and each of the optical marker-based sensors.

16. The method of claim 15, wherein said normalizing comprises, for each value of the received raw motion capture data, dividing a difference between each value of the received raw motion capture data and the minimum value by a difference between the maximum and minimum value.

17. The method of claim 10, further comprising training the generated learning model of the convolutional neural network against a predetermined ground truth based on a dataset of the received raw motion capture data and generated hand pose predictions.

18. The method of claim 10, further comprising animating a character of the 3D virtual environment based on the generated hand pose prediction.

19. A non-transitory computer-readable storage medium for motion capture of an actor to estimate a hand pose prediction of the actor for rendering a three-dimensional (3D) virtual environment, wherein the non-transitory computer-readable storage medium includes instructions that, when executed by at least one processor of a computing system, cause the computing system to perform a method comprising:

receiving raw motion capture data from at least one wearable sensor and at least one optical marker-based sensor;

normalizing the received raw motion capture data via one or more sensor pre-processors;

receiving the normalized motion capture data from the sensor pre-processors via a convolutional neural network;

generating a learning model via the convolutional neural network to detect one or more patterns over a predetermined time window, the detected patterns being encoded by a matrix;

receiving a measurement of bone length from the actor and the matrix of the convolutional neural network via a hand pose dense neural network;

determining an intermediate hand pose prediction at a selected point in time via the hand pose dense neural network based on the received measurement of bone length and the matrix of the convolutional neural network;

learn a mapping of the received measurement of bone lengths and the determined intermediate hand pose prediction via a hand scale dense neural network based on the outputs from the convolutional neural network; and rescaling and offsetting the determined intermediate hand pose prediction based on the learned mapping via a post processor to generate the hand pose prediction.

20. The non-transitory computer-readable storage medium of claim 19, further comprising normalizing the received raw motion capture data by generating one or more position vectors that are scaled to unit length via the one or more sensor pre-processors to determine an optical marker direction in hand space.

* * * * *